(12) United States Patent
Ohta (10) Patent No.: US 11,382,194 B2
(45) Date of Patent: Jul. 5, 2022

(54) LIGHTING CIRCUIT

(71) Applicant: KOITO MANUFACTURING CO., LTD., Tokyo (JP)

(72) Inventor: Shinji Ohta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/032,024

(22) Filed: Sep. 25, 2020

(65) Prior Publication Data

US 2021/0014945 A1    Jan. 14, 2021

Related U.S. Application Data

(63) Continuation of application No. PCT/JP2019/009782, filed on Mar. 11, 2019.

(30) Foreign Application Priority Data

Mar. 28, 2018 (JP) .............................. JP2018-061346

(51) Int. Cl.
*H05B 45/14* (2020.01)
*F21V 23/00* (2015.01)
(Continued)

(52) U.S. Cl.
CPC ........... *H05B 45/14* (2020.01); *F21V 23/003* (2013.01); *H02M 3/06* (2013.01); *H05B 45/30* (2020.01); *F21Y 2115/10* (2016.08); *H05B 45/50* (2020.01)

(58) Field of Classification Search
None
See application file for complete search history.

(56) References Cited

U.S. PATENT DOCUMENTS

2008/0129225 A1    6/2008  Yamamoto et al.
2009/0058318 A1*   3/2009  Fukui ................... H05B 45/382
                                                         315/291
(Continued)

FOREIGN PATENT DOCUMENTS

CN    101742791 A    6/2010
CN    101842914 A    9/2010
(Continued)

OTHER PUBLICATIONS

International Preliminary Report on Patentability (Form PCT/IB/373) and the Written Opinion of the International Searching Authority (Form PCT/ISA/237) dated Sep. 29, 2020, in corresponding International Application No. PCT/JP2019/009782. (11 pages).

(Continued)

*Primary Examiner* — Anh Q Tran
(74) *Attorney, Agent, or Firm* — Buchanan Ingersoll & Rooney PC (57) ABSTRACT

A driving circuit turns on and off a driving current $I_{LED}$ that flows through a light source, so as to control the lighting on/off state of the light source. A judgment circuit compares a voltage $V_{LED}$ across the light source with a threshold value, and judges the lighting on/off state of the light source based on the comparison result. A first resistor R is provided in parallel with the light source.

6 Claims, 5 Drawing Sheets

(51) Int. Cl.
*H02M 3/06* (2006.01)
*H05B 45/30* (2020.01)
*F21Y 115/10* (2016.01)
*H05B 45/50* (2022.01)

(56) References Cited

U.S. PATENT DOCUMENTS

| | | | |
|---|---|---|---|
| 2009/0153059 A1 | 6/2009 | Kitagawa et al. | |
| 2010/0156312 A1 | 6/2010 | Yufuku et al. | |
| 2010/0225235 A1 | 9/2010 | Nagase | |
| 2010/0259195 A1 | 10/2010 | Kamoi | |
| 2011/0169411 A1* | 7/2011 | Inoue | H05B 45/38 315/82 |
| 2012/0146533 A1* | 6/2012 | Park | H05B 45/14 315/224 |
| 2012/0187847 A1* | 7/2012 | Hamamoto | H05B 45/3725 315/125 |
| 2013/0127367 A1* | 5/2013 | Esaki | H05B 45/3725 315/283 |
| 2013/0334962 A1 | 12/2013 | Nishikawa | |
| 2014/0117874 A1* | 5/2014 | Matsumoto | H05B 45/14 315/291 |
| 2016/0081171 A1 | 3/2016 | Ichikawa | |
| 2016/0156152 A1 | 6/2016 | Ichikawa et al. | |
| 2016/0249432 A1 | 8/2016 | Zhang | |
| 2016/0295650 A1 | 10/2016 | Ohki | |
| 2018/0063907 A1 | 3/2018 | Kambara | |

FOREIGN PATENT DOCUMENTS

| | | |
|---|---|---|
| CN | 101861044 A | 10/2010 |
| CN | 103124460 A | 5/2013 |
| CN | 103458568 A | 12/2013 |
| CN | 104282281 A | 1/2015 |
| CN | 205071390 U | 3/2016 |
| CN | 105472834 A | 4/2016 |
| CN | 105657935 A | 6/2016 |
| JP | 2005-302311 A | 10/2005 |
| JP | 2012-134549 A | 7/2012 |
| JP | 2013-219963 A | 10/2013 |
| JP | 2018-037237 A | 3/2018 |

OTHER PUBLICATIONS

International Search Report (Form PCT/ISA/210) dated Apr. 16, 2019, in corresponding International Application No. PCT/JP2019/009782. (3 pages).

Office Action/Search Report dated Mar. 31, 2022, in corresponding Chinese Patent Application No. 201980021343.7 and English translation of the Office Action/Search Report. (20 pages).

* cited by examiner

LIGHTING CIRCUIT

BACKGROUND

1. Technical Field

The present disclosure relates to a lamp employed in a vehicle or the like.

2. Description of the Related Art

Figure 1:
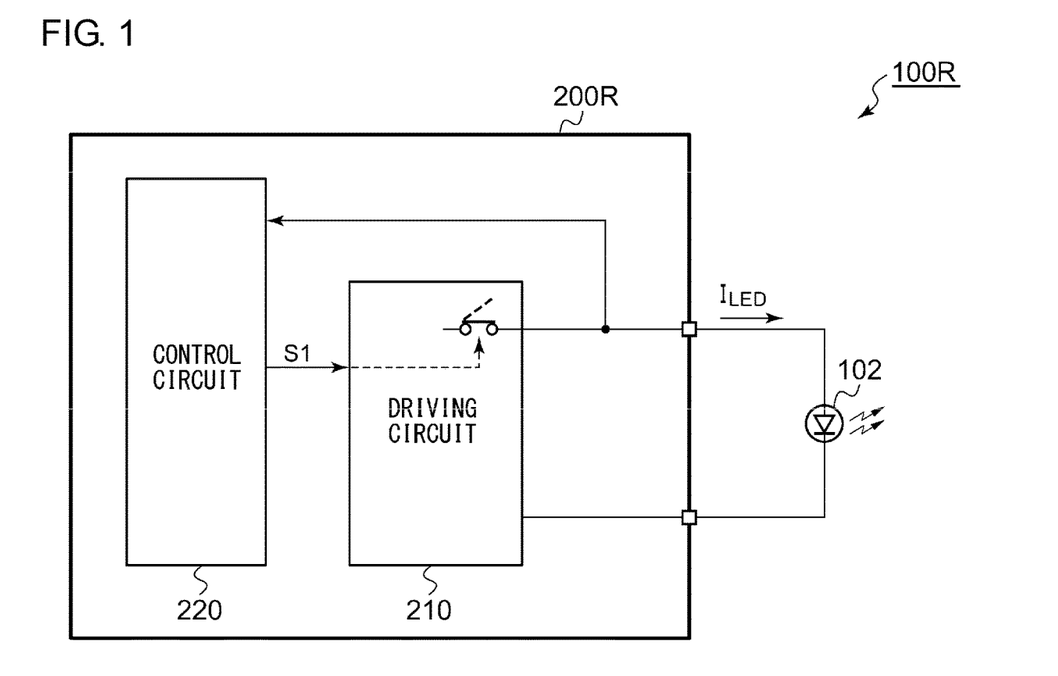
FIG. 1 is a block diagram showing an automotive lamp.

FIG. 1 is a block diagram showing an automotive lamp. An automotive lamp 100R includes a light source 102 and a lighting circuit 200R. The light source 102 is configured as a semiconductor light-emitting element such as a light-emitting diode (LED), laser diode (LD), organic EL, or the like. The lighting circuit 200R supplies a driving current $I_{LED}$ to the light source 102 such that the light source 102 emits light with a desired luminance.

The lighting circuit 200R includes a driving circuit 210 and a control circuit 220. The driving circuit 210 supplies the driving current $I_{LED}$ to the light source 102. The control circuit 220 generates a control signal S1 for instructing the light source 102 to turn on or off. For example, the high level of the control signal S1 corresponds to the lighting-on state of the light source 102, and the low level of the control signal S1 corresponds to the lighting-off state of the light source 102.

The driving circuit 210 switches the driving current $I_{LED}$ between a supply (ON) state and a disconnection (OFF) state according to the control signal S1.

The control circuit 220 has an abnormal state detection function for judging whether or not the light source 102 emits light normally. The abnormal state detection is supported using the current-voltage (I-V) characteristics of the light source 102. Specifically, when the driving current $I_{LED}$ flows through the light source 102 in the lighting-on state of the light source 102, a voltage drop (forward voltage) $V_F$, which can be calculated as a physical property value, occurs across the light source 102. When the driving current $I_{LED}$ becomes zero, the voltage across the light source 102 also becomes zero. Accordingly, in a case in which the voltage across the light source 102 is compared with a threshold value $V_{TH}$ designed to be lower than the forward voltage $V_F$, such an arrangement is capable of judging whether the light source 102 is in the lighting-on state or the lighting-off state. The control circuit 220 compares the lighting on/off state thus judged with the lighting on/off state indicated by an instruction (control signal S1) supplied by the control circuit 220 itself. If they do not match each other, judgement can be made that an abnormal state has occurred. Specifically, when the voltage $V_{LED}$ across the light source 102 is lower than the threshold value $V_{TH}$ even though the light source 102 is instructed to turn on, judgment is made that an abnormal state has occurred.

As a result of investigating the automotive lamp 100R shown in FIG. 1, the present inventor has recognized the following problem. That is to say, when high-intensity light is input to the light source 102 in the lighting-off state thereof, the light source 102 acts like a photodiode. That is to say, electromotive force occurs due to the photoelectric effect. When the electromotive force $V_{TH}$ exceeds the threshold voltage $V_{TH}$, the control circuit 220 makes a false judgment that the light source 102 is in the lighting-on state even when the light source 102 is actually in the lighting-off state, leading to a false judgment that an abnormal state has occurred.

It should be noted that such a problem does not occur in a lighting circuit using a bypass method, i.e., a lighting circuit including a bypass switch arranged in parallel to the light source 102 such that the lighting on/off state of the light source 102 is controlled according to the on/off state of the bypass switch. This is because, with such a bypass method, when the light source 102 is to be turned off, the bypass switch is turned on. In this state, both ends of the light source 102 are short-circuited via the bypass switch. Accordingly, the voltage across both ends is clamped by the bypass switch even if such high-intensity light is input to the light source.

SUMMARY

An embodiment of the present disclosure relates to a lighting circuit for a light source. The lighting circuit includes: a driving circuit structured to turn on and off a driving current that flows through the light source, so as to control a lighting on/off state of the light source; a judgment circuit structured to compare a voltage across the light source with a threshold value, and to judge the lighting on/off state of the light source based on a comparison result; and a first resistor arranged in parallel with the light source.

Another embodiment of the present disclosure relates to an automotive lamp. The automotive lamp includes a light source, and any one of the lighting circuits described above, structured to drive the light source.

It is to be noted that any arbitrary combination or rearrangement of the above-described structural components and so forth is effective as and encompassed by the present embodiments. Moreover, this summary does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overview of the Embodiments

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

An embodiment disclosed in the present specification relates to a lighting circuit for a light source. The lighting circuit includes: a driving circuit structured to turn on and off a driving current that flows through the light source, so as to control a lighting on/off state of the light source; a judgment circuit structured to compare a voltage across the light source with a threshold value, and to judge the lighting on/off state of the light source based on a comparison result; and a first resistor arranged in parallel with the light source.

When high-intensity light such as sunlight is input to the light source in the lighting-off state, this arrangement allows the current that flows through the light source in the reverse direction to be released via the first resistor. With this arrangement, in a state in which the light source is in the lighting-off state, the voltage across the light source can be maintained at a level that is lower than the threshold value. This arrangement is capable of preventing false judgment in the lighting on/off detection, thereby preventing false detection of an abnormal state.

Also, the judgment circuit may include a second resistor and a third resistor structured to divide the voltage across the light source, and to judge the lighting on/off state of the light source based on the voltage thus divided. Also, the first resistor may be designed to have a resistance value that is lower than the sum total of resistance values of the second resistor and the third resistor.

Also, the first resistor may be structured as a series connection of a second resistor element and a third resistor element. Also, the judgment circuit may judge the lighting on/off state of the light source based on a voltage that occurs at a connection node between the second resistor element and the third resistor element. In a case in which the resistance value of the dividing circuit including the second resistor element and the third resistor element is designed to be sufficiently low, this allows the dividing circuit to function as the first resistor.

Also, the resistance value of the first resistor may be designed such that, when sunlight is input to the light source in a lighting-off state, the voltage across the light source may preferably be lower than ½ of the threshold value, and may more preferably be lower than ⅕ of the threshold value.

Embodiment

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

In the present specification, a state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the vertical axis and the horizontal axis shown in the waveform diagrams and the time charts in the present specification are expanded or reduced as appropriate for ease of understanding. Also, each waveform shown in the drawing is simplified or exaggerated for emphasis or ease of understanding.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Figure 2:
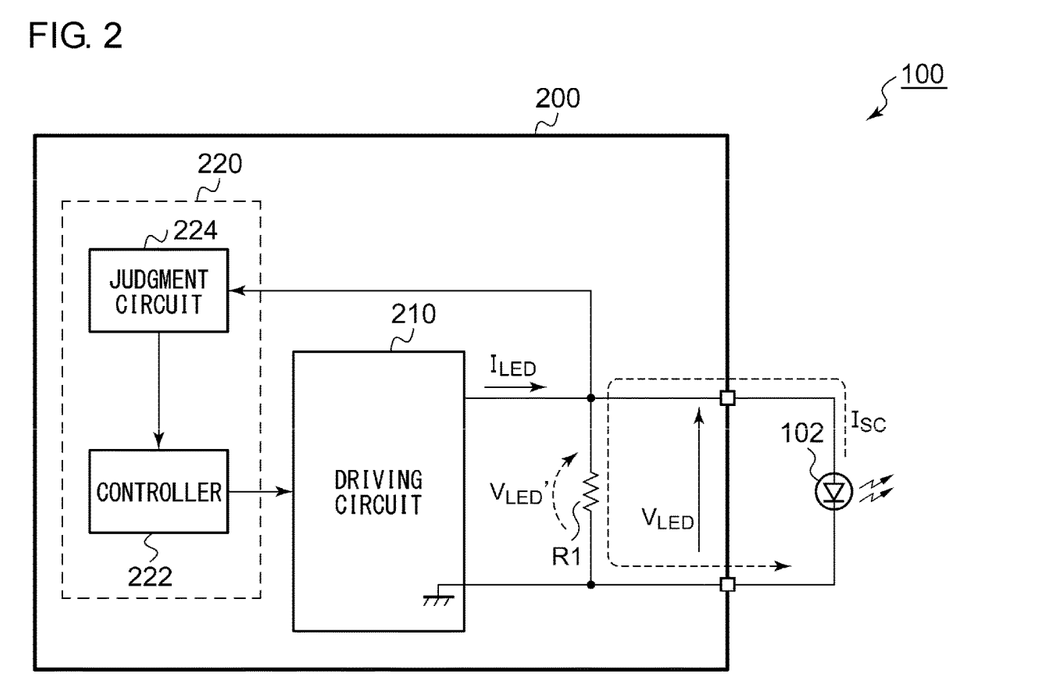
FIG. 2 is a block diagram showing an automotive lamp including a lighting circuit according to an embodiment.

FIG. 2 is a block diagram showing an automotive lamp 100 including a lighting circuit 200 according to an embodiment. The automotive lamp 100 includes a light source 102 and a lighting circuit 200 that controls the lighting on/off state and the luminance of the light source 102. Typically, the light source 102 is configured as an LED. Also, the light source 102 may be configured as another kind of semiconductor light-emitting device such as an LD, organic EL, or the like.

The lighting circuit 200 includes a driving circuit 210 and a control circuit 220. The driving circuit 210 turns on and off a driving current $I_{LED}$ that flows through the light source 102 according to a control signal S1 supplied from the control circuit 220, so as to control the lighting on/off state of the light source 102. Also, the driving circuit 210 may control the driving current $I_{LED}$ in an analog manner so as to control the luminance of the light source 102. The on/off state of the light source 102 based on the control signal S1 may be switched on a long time scale. Also, the on/off state of the light source 102 may be switched in a short cycle as with a PWM dimming control operation.

The control circuit 220 includes a controller 222 and a judgment circuit 224. The controller 222 supplies the control signal S1 to the driving circuit 210. The judgment circuit 224 compares a voltage $V_{LED}$ across the light source 102 with a threshold value $V_{TH}$, and judges whether the light source 102 is in the lighting-on state or the lighting-off state based on the comparison result. Specifically, when $V_{LED} > V_{TH}$, the judgment circuit 224 judges that the light source 102 is in the lighting-on state. Conversely, when $V_{LED} < V_{TH}$, the judgment circuit 224 judges that the light source 102 is in the lighting-off state.

A first resistor R1 is arranged in parallel with the light source 102. The resistance value of the first resistor R1 is designed such that, when high-intensity light is input to the light source 102 in the lighting-off state of the light source 102, the voltage $V_{LED}'$ across the light source 102 is lower than the threshold value $V_{TH}$. For example, description will be made assuming that, when the light source 102 is in the lighting-on state, the voltage $V_{LED}$ across the light source 102 becomes $V_F=3$ V, and the threshold voltage $V_{TH}$ is set to $V_F/2=1.5$ V. In this case, the resistance value of the first resistor R1 is designed such that, when high-intensity light is input to the light source 102, the voltage $V_{LED}'$ across the light source 102 is lower than 1.5 V.

Figure 3:
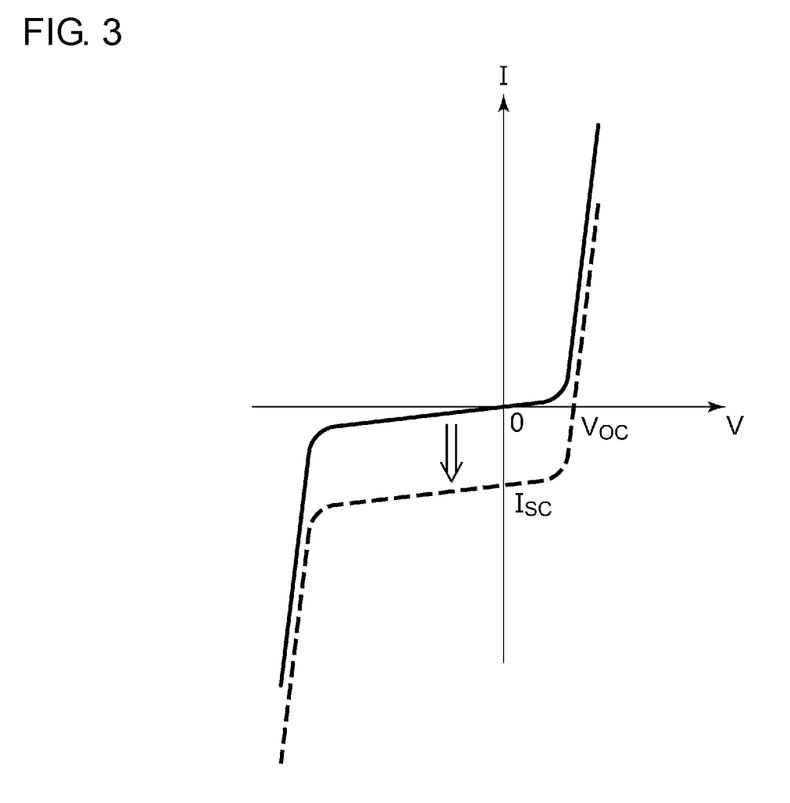
FIG. 3 is a diagram showing the I-V characteristics of a photodiode.

Here, description will be made assuming that, when high-intensity light is input, the light source 102 has the same characteristics as those of a photodiode. FIG. 3 is a diagram showing the I-V characteristics of a photodiode. When the input light intensity is zero, the photodiode has the same I-V characteristics as those of an LED as represented by the solid line. When light is input to the photodiode, the I-V characteristics are shifted toward the negative side with a shift amount that depends on the amount of input light. In a case in which both ends of the photodiode are opened when the light is input, an open voltage $V_{DC}$ occurs across the photodiode. In a case in which both ends of the photodiode are short-circuited via a low-impedance component when the light is input, the photodiode acts as a current source, leading to a current $I_{SC}$ that flows in the reverse direction. The current $I_{SC}$ is substantially proportional to the amount of input light.

Returning to FIG. 2, when light is input to the light source 102, the current $I_{SC}$ flows through the resistor R1, leading to the occurrence of the voltage difference $V_{LED}'$.

$$V_{LED}'=I_{SC}\times R1$$

The current $I_{SC}$ that flows in a state in which a possible maximum light amount is input in the actual use of the vehicle is represented by "$I_{SC(MAX)}$". In this case, the resistance value of the first resistor R1 may preferably be designed so as to satisfy the following relation.

$$V_{LED}'=R1\times I_{SC(MAX)}<V_{TH}$$

By transforming this relation expression, the following expression is obtained.

$$R1<V_{TH}/I_{SC(MAX)}$$

It should be noted that, giving consideration to variation in elements or variation in the light amount, $V_{LED}'$ may preferably be designed to be lower than ½ of the threshold voltage $V_{TH}$. More preferably, $V_{LED}'$ may be designed to be lower than ⅕ of the threshold voltage $V_{TH}$. Even more preferably, $V_{LED}'$ may be designed to be on the order of 1/10 of the threshold voltage $V_{TH}$. As an example, in a case in which $V_{TH}=1.5$ V, $V_{LED}'$ may be designed to be on the order of 0.2 V. In a case in which $I_{SC(MAX)}=200$ µA, the resistance value of the first resistor R1 is designed such that R1=1 kΩ.

The above is the configuration of the automotive lamp 100. Next, description will be made regarding the operation thereof.

Normal State with Lighting-on Instruction without Input Light

The driving current $I_{LED}$ is supplied to the light source 102. In this state, $V_{LED}=V_F>V_{TH}$ holds true. The judgment circuit 224 is able to make a correct judgment that the light source 102 is in the lighting-on state. It should be noted that, in a case in which $V_F=3$ V, a current of 3 mA flows through the first resistor R1 having a resistance of 1 kΩ. In a case in which $I_{LED}=600$ mA, the current that flows through the first resistor R1 is 0.5% of $I_{LED}$, which is consumed in the first resistor R1.

Normal State with Lighting-Off Instruction without Input Light

The driving circuit 210 sets the driving current $I_{LED}$ to zero. In this state, the voltage $V_{LED}$ across the light source 102 becomes zero. Accordingly, the relation $V_{LED}<V_{TH}$ holds true. Thus, the judgment circuit 224 is able to make a correct judgment that the light source 102 is in the lighting-off state.

Abnormal State with Lighting-on Instruction without Input Light

When a short-circuited state occurs across the light source 102, the voltage $V_{LED}$ across light source 102 becomes substantially zero. In this state, the relation expression $V_{LED}<V_{TH}$ holds true. Accordingly, the judgment circuit 224 is able to make a correct judgment that the light source 102 is in the lighting-off state. It should be noted that the light source 102 has been judged to be in the lighting-off state although a lighting-on instruction has been issued. Accordingly, the judgment circuit 224 is able to make a correct judgment that an abnormal state has occurred.

Normal State with Lighting-Off Instruction with Input Light

When light is input to the light source 102, the current $I_{SC}$ flows through the light source 102 in the reverse direction. A reverse current $I_{SC}$ flows into the first resistor R1. In this state, the voltage $V_{LED}'$ across the light source 102 is represented by $I_{SC}\times R1$. This arrangement ensures that the voltage $V_{LED}'$ is lower than the threshold voltage $V_{TH}$. Accordingly, the judgment circuit 224 is able to make a correct judgment that the light source 102 is in the lighting-off state.

The above is the operation of the automotive lamp 100. With the automotive lamp 100, this arrangement is capable of preventing false judgement of the lighting on/off state, thereby allowing false detection of an abnormal state to be prevented.

The present disclosure encompasses various kinds of apparatuses and methods that can be regarded as a block configuration or a circuit configuration shown in FIG. 2, or that can be derived from the aforementioned description. That is to say, the present disclosure is not restricted to a specific configuration. More specific description will be made below regarding example configurations and examples for clarification and ease of understanding of the essence of the present disclosure and the operation. That is to say, the following description will by no means be intended to restrict the technical scope of the present disclosure.

Figure 4A:
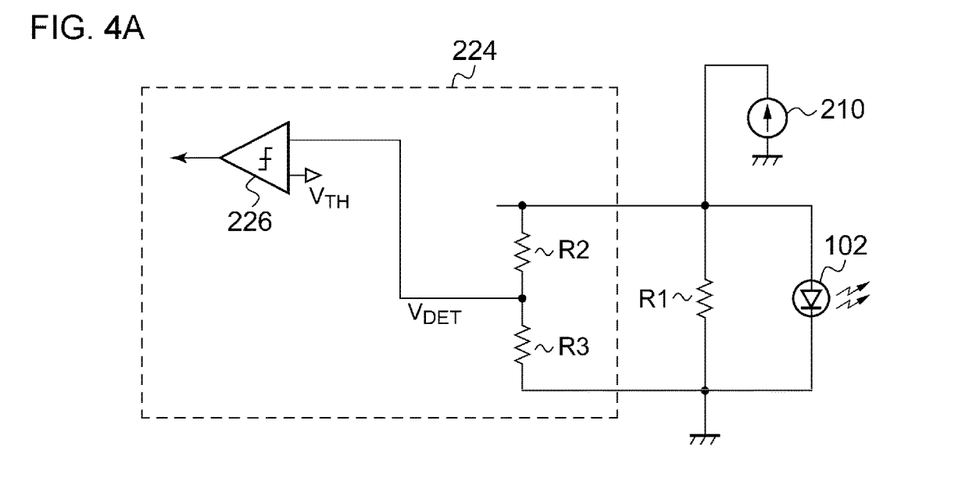
FIGS. 4A through 4C are circuit diagrams each showing an example configuration of a judgment circuit.
Figure 4B:
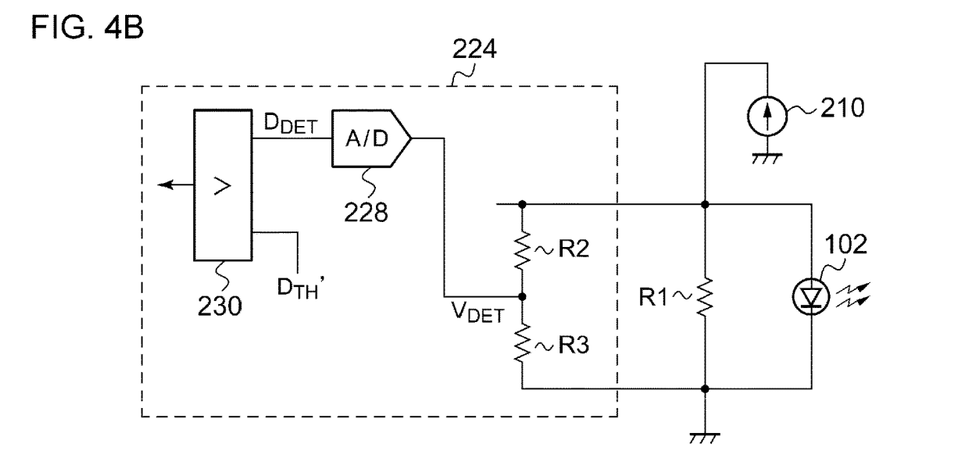
Figure 4C:
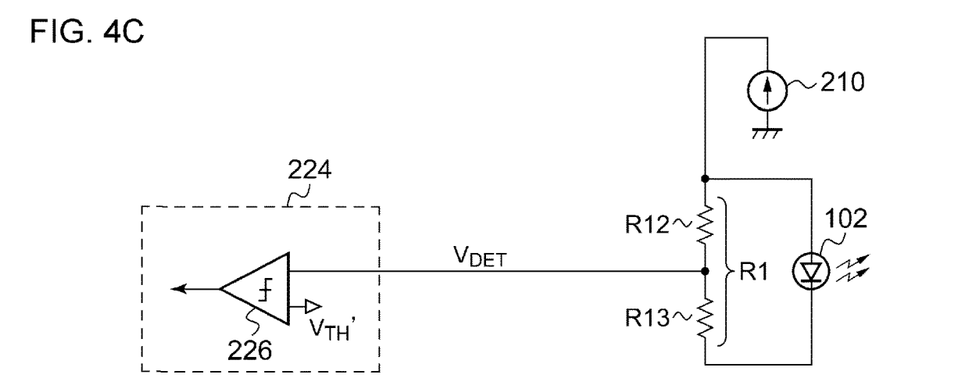

FIGS. 4A through 4C are circuit diagrams each showing an example configuration of the judgment circuit 224. The driving circuit is shown as a current source. The judgment circuit 224 includes a second resistor R2 and a third resistor R3 configured to divide the voltage $V_{LED}$ across the light source 102. The judgment circuit 224 judges whether the light source 102 is in the lighting-on state or the lighting-off state based on the divided voltage $V_{DET}$. With this arrangement, the relation expression $V_{DET}=R3/(R2+R3)\times V_{LED}$ holds true. A voltage comparator 226 compares the detection voltage $V_{DET}$ with a threshold voltage $V_{TH}'$ (=$R3/(R2+R3)\times V_{TH}$) scaled with a voltage dividing ratio $R3/(R2+R3)$. When the relation $V_{DET}<V_{TH}'$ holds true, the judgment circuit 224 judges that the light source 102 is in the lighting-off state.

FIG. 4B shows the judgment circuit 224 having the same configuration as that shown in FIG. 4A except that the voltage comparator 226 shown in FIG. 4A is replaced by an A/D converter 228 and a digital comparator 230. The A/D converter 228 converts the voltage $V_{DET}$ thus divided into a digital value. The digital comparator 230 compares the digital value $D_{DET}$, which is an output of the A/D converter 228, with a digital value $D_TZ$ that corresponds to the threshold value $V_{TH}'$.

In the examples shown in FIGS. 4A and 4B, the second resistor R2 and the third resistor R3 are designed to have a resistance that is sufficiently higher than that of the first resistor R1, so as not to cause unnecessary power consumption. In other words, the resistance value of the first resistor R1 is designed to be lower than the sum total of the resistance values of the second resistor R2 and the third resistor R3. Typically, the sum total of the resistance values, i.e., R2+R3, is on the order of several dozen Ω to several hundred Ω.

FIG. 4C shows an example in which the resistors R2 and R3 provided for voltage dividing function as the first resistor R1. Specifically, the first resistor R1 is configured as a series connection of a second resistor element R12 that corresponds to R2 and a third resistor element R13. The judgment circuit 224 judges the lighting on/off state of the light source 102 based on the voltage $V_{DET}$ that occurs at a connection node between the second resistor element R12 and the third resistor element R13. As shown in FIG. 4A, the judgment circuit 224 may include a voltage comparator. Also, as shown in FIG. 4B, the judgment circuit 224 may include an A/D converter and a digital comparator. In the example shown in FIG. 4C, the resistance values are designed such that the relation $(R12+R13)<V_{TH}/I_{SC(MAX)}$ holds true.

Figure 5A:
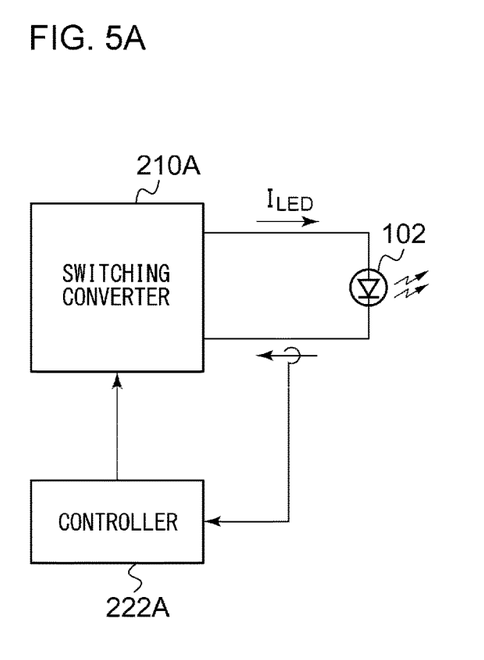
FIGS. 5A and 5B are block diagrams each showing an example configuration of a driving circuit.
Figure 5B:
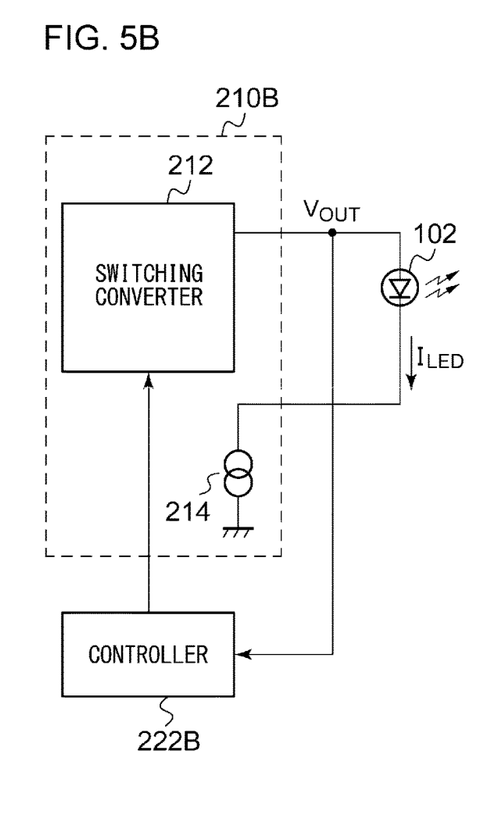

FIGS. 5A and 5B are block diagrams each showing an example configuration of the driving circuit 210. A driving circuit 210A shown in FIG. 5A includes a switching converter. In a state in which a lighting-on instruction is issued, a controller 222A controls the driving circuit 210A in a constant current control manner such that the current $I_{LED}$ that flows through the light source 102 approaches its target value $I_{REF}$.

A driving circuit 210B shown in FIG. 5B includes a switching converter 212 and a constant current source 214. In a state in which a lighting-on instruction is issued, the constant current source 214 stabilizes the amount of current that flows through the light source 102 to its target value $I_{REF}$. Furthermore, in a state in which a lighting-on instruction is issued, the controller 222 generates a driving voltage $V_{OUT}$ across a series connection of the light source 102 and the constant current source 214. The controller 222B feedback controls the switching converter 212 such that the driving voltage $V_{OUT}$ approaches a predetermined target value, such that the voltage across the constant current source 214 approaches a predetermined target value, or such that the voltage across the constant current source 214 does not become lower that a predetermined lower limit voltage. It should be noted that FIG. 5B shows an example in which the constant current source 214 is arranged on the cathode side of the light source 102. Also, the constant current source 214 may be arranged on the anode side of the light source 102.

While the preferred embodiments of the present disclosure have been described using specific terms, such description is for illustrative purposes only, and it is to be understood that changes and variations may be made without departing from the spirit or scope of the appended claims.

What is claimed is:

1. A lighting circuit for a light source, comprising:
a driving circuit structured to turn on and off a driving current that flows through the light source based on an instruction, so as to control an instructed lighting on/off state of the light source;
a judgment circuit structured to compare a voltage across the light source with a threshold value, and to judge the actual lighting on/off state of the light source based on a comparison result; and
a first resistor arranged in parallel with the light source,
wherein judgment circuit is configured to determine the light source is in the actual lighting-off state when the voltage across the light source is zero, and to determine the light source is in the actual lighting-on state when the voltage across the light source is higher than a threshold value, and the actual lighting on/off state is compared to the instructed on/off state.

2. The lighting circuit according to claim 1, wherein the judgment circuit comprises a second resistor and a third resistor structured to divide the voltage across the light source, and to judge the actual lighting on/off state of the light source based on the voltage thus divided,
and wherein the first resistor has a resistance value that is lower than the sum total of resistance values of the second resistor and the third resistor.

3. The lighting circuit according to claim 1, wherein the first resistor is structured as a series connection of a second resistor element and a third resistor element,
and wherein the judgment circuit is configured to judge the actual lighting on/off state of the light source based on a voltage that occurs at a connection node between the second resistor element and the third resistor element.

4. The lighting circuit according to claim 1, wherein the resistance value of the first resistor is such that, when sunlight is input to the light source in the actual lighting-off state, the voltage across the light source is lower than ½ of the threshold value.

5. An automotive lamp comprising a light source, and the lighting circuit according to claim 1, which is structured to drive the light source.

6. The lighting circuit according to claim 1, wherein when a reverse current flows through the light source in a reverse direction when high-intensity light is input to the light source in the actual lighting-off state, the first resistor is configured so that the reverse current flows through the first resistor.

* * * * *